United States Patent [19]

Tomer

[11] Patent Number: 4,716,929
[45] Date of Patent: Jan. 5, 1988

[54] FLOW CONTROL VALVE
[75] Inventor: Lewis P. Tomer, Mentor, Ohio
[73] Assignee: B. W. Rogers Company, Akron, Ohio
[21] Appl. No.: 45,286
[22] Filed: May 4, 1987
[51] Int. Cl.$^4$ ............................................. G05D 16/10
[52] U.S. Cl. .................................. 137/505.13; 91/443; 91/447
[58] Field of Search .................. 91/443, 447; 137/493, 137/505.13

[56]  References Cited
U.S. PATENT DOCUMENTS

| 3,414,007 | 12/1968 | DeMarco | 137/493 |
| 3,420,146 | 1/1969 | McPherson | 91/443 |
| 3,421,545 | 1/1969 | DeMarco | 137/513.3 |
| 3,433,253 | 3/1969 | Tomer | 137/493 |
| 4,132,153 | 1/1979 | Grotness | 91/443 X |
| 4,601,366 | 7/1986 | Blain | 137/505.13 X |

Primary Examiner—Robert G. Nilson
Attorney, Agent, or Firm—Renner, Kenner, Greive, Bobak & Taylor

[57] ABSTRACT

A pressure compensated flow control valve (10) embodying the concepts of the present invention is particularly suited for use as a component within the hydraulic system of a fork lift truck (11) in order to permit an unrestricted flow of fluid therethrough to raise the forks (18), either with or without a load (19), and to control the flow of fluid therethrough in order to govern the speed at which the forks (18) lower a load (19). During the lowering of the load (19) the valve (10) is properly responsive to actual, apparent and/or transient loading changes. The valve (10) employs a spool (95) slidable within a cavity (75). The spool (95) has a piston portion (96), and a sleeve (135) is slidably mounted on the skirt (125) of the piston (96). The translation of the piston (96) relative to the cavity (75), and the translation of the sleeve (135) relative to the piston (96) effects opening and closing of the ports (156) required to effect control of the fluid flowing between a distribution chamber (155) in the valve (10) and the load lifting/lowering cylinder (20). Axial translation of the piston (96) and the sleeve (135) is effected in response to fluid pressure and/or fluid flow experienced at the valve (10), and hydraulic biasing means (106,115), acting in concert with mechanical biasing means (161,162), are provided selectively to assist, or resist, translation of the spool (95).

24 Claims, 6 Drawing Figures

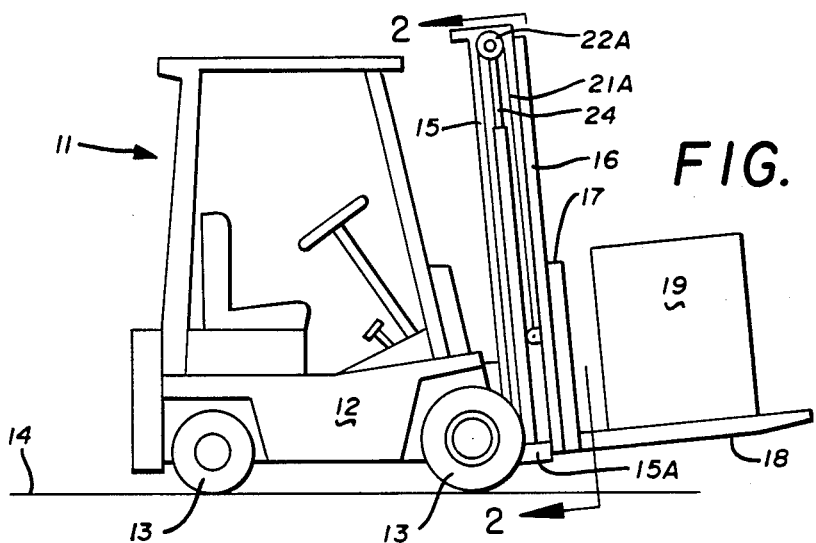
FIG. 1
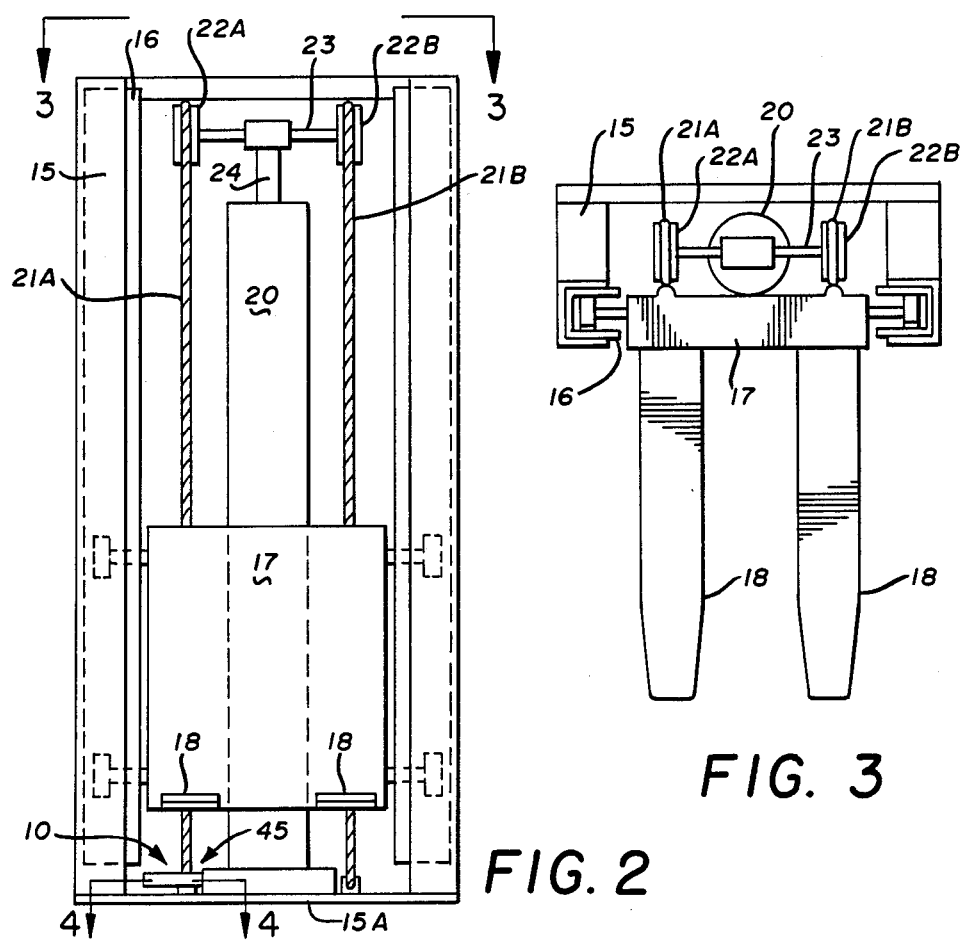
FIG. 2
FIG. 3

FLOW CONTROL VALVE

TECHNICAL FIELD

The present invention relates generally to flow control valves for hydraulic systems. More particularly, the present invention relates to a pressure compensated flow control valve. Specifically, the present invention relates to a pressure compensated flow control valve that is particularly adapted for employment in conjunction with a fork lift truck to provide unrestricted flow therethrough when the forks are being lifted, and irrespective of the magnitude of the load being raised, and yet to regulate the speed at which the forks can be lowered in direct response to the size of the load supported by the forks—the aforesaid speed regulation providing a safe and proper response to actual, apparent and/or transient loading.

BACKGROUND OF THE INVENTION

Fork lift trucks are extensively employed to raise and lower objects of widely varying weight. For efficiency it is desirable that the lifting and lowering functions be accomplished at the highest speed consistent with safety. When dealing with relatively light loads no problems are generally encountered when either lifting or lowering the loads at the maximum speed available with the hydraulic system employed by the truck. However, as the weight of the load increases serious problems can be encountered if the lowering speed is not controlled within limits commensurate with the weight of the load.

Even though some operators can develop a rather delicate "touch" in the manipulation of the system control valve so as to provide a modicum of speed control by applying that tactile sensitivity to throttle the system valve during the lowering operation, it is quite dangerous to rely solely on the operator's skillful manipulation of the system control valve. Under heavy loads the lowering speeds can quickly approach dangerous levels. A moment's inattention can allow the load to reach dangerous momentum, and if the operator attempts to reduce the lowering speed too abruptly, the inertial forces of the lowering load can seriously damage the hoist mechanism, cause a displacement of the load and even tilt the truck itself, thereby endangering the life of the operator and anyone else in the immediate area.

Attempts have been made to provide flow control valves that automatically adjust the lowering speeds in relation to the size of the load being lowered. Initially, however, such attempts were relatively unsuccessful because the flow control valves were fully open at the inception of the lowering operation. During the time required for such valves to effect a modulation in the flow of the hydraulic fluid therethrough it was quite possible for the load to have already dropped an appreciable distance, thereby having gained a dangerous momentum before the flow control valve could become effective.

The first breakthrough in providing a relatively successful and safe flow control valve was with the particular valve disclosed in U.S. Pat. No. 3,414,007. That valve provided the first successful means by which to sense the load on the forks and adjust the flow rate through the valve in response to the load sensed, and it served as the industry standard for two decades with only modest changes being incorporated from time to time. The major deficiency of a pressure sensing valve made in conformity with that patent resides primarily in the fact that it responds with alacrity to an apparent, or transient, load as well as to an actual load. Hence, if the valve is subjected to an apparent decrease in loading at a time when the load is already being lowered, as would be the situation were the truck to engage a sudden drop in the surface over which it is traversing, the valve would immediately respond to the apparent load decrease and open, thus allowing the actual load to lower at in increased, and perhaps dangerous, rate of speed before the valve could respond to the true situation. Of less concern, but also a drawback was the rather loud hissing sound created by the unusual orifice pattern within that particular prior art valve.

Attempts were made to alleviate the undesirable sound, and the modifications which accomplished that end are disclosed in U.S. Pat. Nos. 3,421,545 and 3,433,253. In both arrangements a flap type valve member is employed that allows high flow rate when lifting a load, but which swings back into position where it blocks the orifice through the valve to the degree necessary to restrict flow, as required, to lower a heavy weight at the desired reduced rate of speed. Such valves adjust quite well to increasing or decreasing loads, so long as the sensing is done when there is no flow through the valve. However, as soon as flow is initiated, and a pressure differential occurs across the flap valve, it tends to bind against the orifice it is controlling and thereby inhibits the facile adjustment of the orifice should the load induced pressure change.

As a further disadvantage, all known prior art flow control valves have unusual exterior configurations which require that they be mounted, to a large degree, exteriorly with respect to the base of the cylinder with which they are operating, thus subjecting them to inadvertent physical abuse.

SUMMARY OF THE INVENTION

It is, therefore, a primary object of the present invention to provide a flow control valve that is fully responsive to actual, apparent and transient loading.

It is another object of the present invention to provide a flow control valve, as above, that is readily adapted for employment in conjunction with fork lift trucks.

It is a further object of the present invention to provide a flow control valve, as above, the lifting mode of which remains unaffected by variations in the load that are imposed upon the fork lift truck.

It is a still further object of the present invention to provide a flow control valve, as above, the lowering mode of which is slowly responsive to a loading variation of greater than a fifteen percent differential (relative to the maximum rated load) being imposed upon the fork lift truck in order to distinguish between a momentary, apparent or transient load change and an actual change in the loading.

It is an even further object of the present invention to provide a flow control valve, as above, the lowering mode of which is rapidly responsive to loads of increased magnitude being imposed upon the fork lift truck.

It is yet another object of the present invention to provide a pressure responsive flow control valve, as above, that will control the lowering speed of a load in response to the weight of that load consistent with safety and efficiency.

It is an additional object of the present invention to provide a pressure responsive flow control valve, as above, that may be incorporated within a cylindrical cartridge so as to facilitate the protective mounting thereof within the base of the cylinder with which it is to be employed.

It is still another object of the present invention to provide a pressure responsive flow control valve, as above, that will operate relatively quietly without making the objectionable hissing sound associated with certain prior art arrangements.

These and other objects of the present invention, as well as the advantages thereof over existing and prior art forms, will become apparent from the following specification and are accomplished by means hereinafter described and claimed.

In general, a pressure compensated flow control valve embodying the concepts of the present invention is incorporated in a housing that contains at least one interior cavity that is bounded by a smooth interior surface along which the piston portion of a spool may be slidingly reciprocated. In addition to the piston portion, the spool is also provided with a skirt portion that extends outwardly of the piston portion. A distribution chamber is disposed within the cavity in the housing but radially outwardly of the skirt portion. At least one entrance port provides communication between the distribution chamber and the exterior of the housing.

A flow chamber is located interiorly of the skirt portion of the spool, and a passage provides continuous communication between the flow chamber and the exterior of the housing. One or more communicating ports penetrate the skirt portion to allow hydraulic fluid to flow between the distribution chamber and the flow chamber. A flow control sleeve is mounted on the skirt portion of the piston progressively to open and close the communicating ports in response to instantaneous pressure differentials within the cavity. An accessing port is also provided through the skirt portion. The accessing port is sufficiently constricted that it can accommodate only minimal fluid flow therethrough, and the accessing port is located such that it cannot be further restricted, or closed, by the flow control sleeve.

Hydraulic biasing means, acting in concert with mechanical biasing means, are provided selectively to resist axial translation of the spool caused by hydraulic pressure within the flow chamber.

One preferred embodiment of a pressure compensated flow control valve embodying the concepts of the present invention is shown by way of example in the accompanying drawings without attempting to show all of the various forms and modifications in which the invention might be embodied; the invention being measured by the appended claims and not by the details of the specification.

BRIEF DESCRIPTION OF THE DRAWINGS

FIG. 1 is a side elevation of a representative fork lift truck in which a pressure compensated flow control valve embodying the concepts of the present invention may be incorporated;

FIG. 2 is an enlarged frontal elevation of the vertical mast arrangement on the fork lift truck depicted in FIG. 1 and taken substantially along line 2—2 of FIG. 1;

FIG. 3 is a top plan view of the mast arrangement depicted in FIGS. 1 and 2 and taken substantially along line 3—3 of FIG. 2;

DESCRIPTION OF AN EXEMPLARY EMBODIMENT

Figure 4:
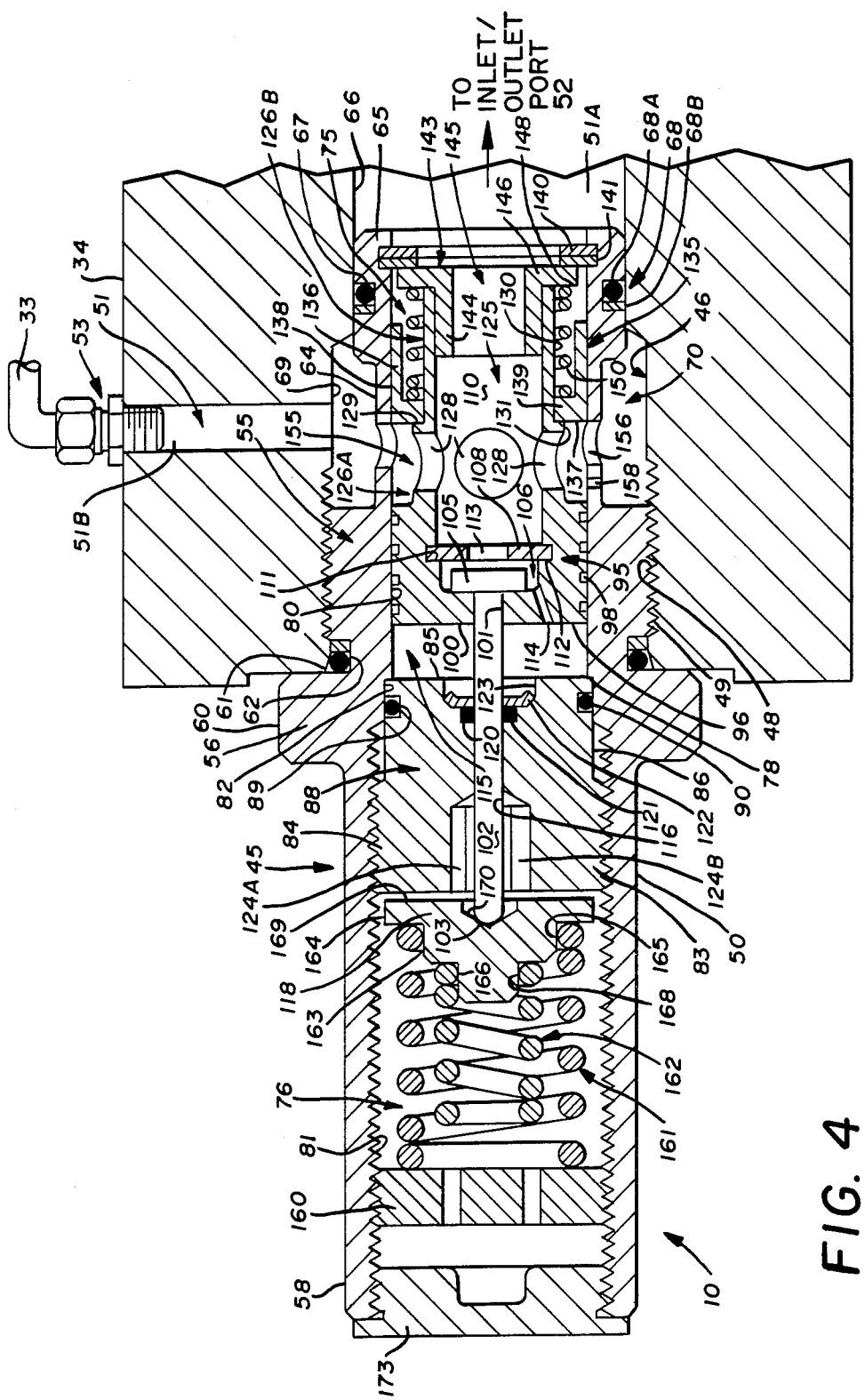
FIG. 4 is a further enlarged, horizontal section taken substantially along line 4—4 of FIG. 2 and depicting, in detail, a pressure compensated flow control embodying the concept of the present invention.

A pressure compensated flow control valve embodying the concepts of the present invention is designated generally by the numeral 10 on the attached drawings and is described in conjunction with its employment in the environment of a fork lift truck 11, an example of which is depicted in FIGS. 1-3. The flow control valve 10 is, as will hereinafter become apparent, particularly adapted for use in conjunction with a fork lift truck 11 to obviate the problems historically encountered in the operation thereof, and particularly those confronted in the process of raising and/or lowering of the forks under various loads within the safe operating range of any given truck 11.

Fork lift trucks 11 typically have a counterbalanced body portion 12 and supporting wheels 13 that permit vehicular movement from place to place on a supporting surface 14. On the front of the body portion 12 is a generally vertically oriented, upright main mast 15. As depicted, the top of the main mast 15 is normally tilted slightly rearwardly to assist in containing the center of gravity of the main mast 15, and everything supported therefrom, within an acceptable fore and aft envelope.

A supplemental mast 16 is mounted on the main mast 15 for vertical movement through a preselected range. Typically, a hoist carriage 17 is mounted for movement along substantially the full length of the supplemental mast 16, and the forks 18, which raise and lower the load 19, are presented from the hoist carriage 17. The aforementioned movement of the hoist carriage 17, and the forks 18 presented therefrom, with respect to the supplemental mast 16, as well as the movement of the supplemental mast 16 relative to the main mast 15, is achieved by actuation of the fork lift cylinder 20.

The prior art is replete with a wide variety of mechanical arrangements by which to raise and lower the forks 18 in response to actuation of the cylinder 20, and the particular choice is not critical to the operation of a pressure compensated flow control valve 10 embodying the concepts of the present invention. As such, the following arrangement is described simply for the purpose of establishing a typical environment within which to describe the operation of the valve 10.

On that basis, then, one end on each of a laterally spaced pair of drive cables, or chains, 21A and 21B is connected to the frame base 15A of the main mast 15 and reeved upwardly, and over, a pair of sheaves, or sprockets, 22A and 22B rotatively supported from a beam 23 that is secured to, and extends transversely of, a piston rod 24 that emanates, for extension and retraction, from the cylinder 20. The other end of each drive cable 21A and 21B is secured to the hoist carriage 17.

In the arrangement depicted, when the piston rod 24 is extended from the cylinder 20 it applies tension to the drive cables 21A and 21B, and with the one end of each affixed to the frame base 15A of the main mast 15 the other end serves to raise the hoist carriage 17 along the supplemental mast 16. This particular arrangement raises the hoist carriage 17 at a 2:1 ratio relative to the extension of the piston rod 24. Thus, when the piston rod 24 has been extended to approximately one half of its length, the hoist carriage 17 engages a stop, not shown, affixed to the supplemental mast 16 such that continued extension of the piston rod 24 raises the supplemental mast 16 relative to the main mast 15, also at the 2:1 ratio.

Figure 5:
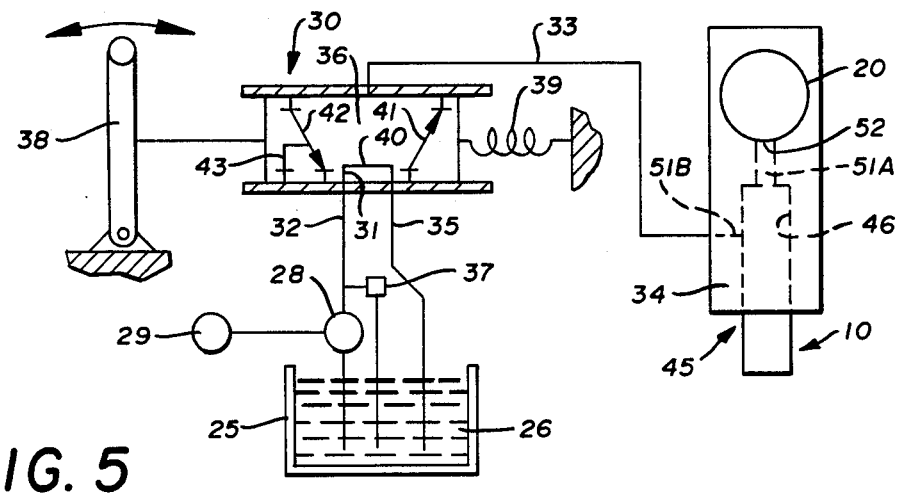
FIG. 5 is a schematic representation of a hydraulic system of the type typically incorporated in a fork lift truck and suitable for operation in conjunction with the pressure compensated flow control valve depicted in FIG. 4; and, FIG. 6 is a graph that represents the rate of flow through the flow control valve depicted in FIG. 4 in response to the hydraulic pressure in the lift cylinder, which communicates with the flow control valve.

The hydraulic pressure necessary to actuate the cylinder 20 is generally provided by a system such as that depicted schematically in FIG. 5. Typically, a pump 28 driven by a suitable motor 29 supplies hydraulic fluid 26 from a reservoir 25. The pressurized hydraulic fluid 26 is fed by the pump 28 to the high pressure input port 31 of a three position, three way, system control valve 30 through high pressure supply conduit 32. Another high pressure line, the actuating conduit 33, transmits the hydraulic fluid 26 to the base 34 of the cylinder 20. The cylinder base 34 may be demountably secured to the frame base 15A by means well known to the art. The actuating conduit 33 also serves as the return flow passageway between the cylinder base 34 and the valve 30 when the system control valve 30 is actuated to connect the conduit 33 to the low pressure exhaust conduit 35 that empties the fluid 26 from the valve 30 back into the reservoir 25.

The flow of hydraulic fluid 26 through the system control valve 30 is controlled by a spool 36, and the spool 36 may be operated by a hand lever 38, against the biasing action of a centering spring 39, in a manner well known to the art. In that regard, the spool 36 may incorporate a circulating duct 40 which will permit the high pressure fluid 26 entering through the input port 31 to return, through exhaust conduit 35, to the reservoir 25 when the spool 36 is in its centered, or neutral, position, as schematically depicted in FIG. 5.

A high pressure duct 41 is also provided in the spool 36 to communicate between the supply conduit 32 and the actuating conduit 33 when the system control valave 30 is actuated to effect the hereinafter described lifting mode of the flow control valve 10. Conversely, a return duct 42 is provided in spool 36 to communicate between the actuating conduit 33 and the exhaust conduit 35 when the sytem control valve 30 is actuated to effect the hereinafter described lowering mode of the flow control valve 10.

For some installations a relief duct 43 is provided in the spool 36 to permit fluid 26 pumped into the high pressure supply conduit 32 to return to the reservoir 25 through the exhaust conduit 35 when the system control valve 30 is actuated to effect the lowering mode.

It should also be noted that a pressure relief valve 37 is preferably provided on the high pressure side of pump 28. As is well known to the art, such a valve 37 may communicate with the high pressure supply conduit 32.

In fact, the entire environmental arrangement heretofore described is well known to the art. The novel, pressure compensated flow control valve 10 of the subject invention is operatively interposed between the system control valve 30 and the cylinder 20.

For convenience, the pressure compensated flow control valve 10 may be incorporated in a cartridge 45 that can be itself rather uniquely incorporated within the base 34 of the cylinder 16, as best seen in FIGS. 2-4, where it is readily accessible and yet where it lies protected against inadvertent damage by careless operation of the fork lift truck 11. However, the unique operation of the valve 10 is not in any way determined by its physical location, so long as it is operatively interposed along the passageway that communicates between the system control valve 30 and the cylinder 20.

To expand upon the preferred location of the cartridge 45 before explaining the construction of the valve 10, a receptacle 46, as best seen in FIG. 4, is provided in the the cylinder base 34, and at least a portion of the receptacle 46 is internally threaded, as at 48, to receive the mating threads 49 on the housing 50 of the cartridge 45. The receptacle 46 intersects a feeder passage 51 within the base 34. One branch 51A of the feeder passage 51 extends axially with respect to the receptacle 46 and communicates with the inlet/outlet port 52 in cylinder 20. The second branch 51B of the feeder passage 51 extends radially outwardly of the receptacle 46, and the actuating conduit 33 communicates with the second branch 51B by virtue of a coupler 53 that is connected to the exterior of cylinder base 34. The flow control valve 10 is thus effectively interposed within the passageway that communicates between the system control valve 30 and the cylinder 20.

The housing 50 may be conveniently fabricated in an elongated, and generally cylindrical, configuration. A first, tubular portion 55 is received within the receptacle 46. A flange 56 extends radially outwardly of the housing 50 at the demarcation between the first, tubular portion 55 and the second, or exterior, tubular portion 58 of the housing 50. The radially outermost surface 60 of the flange 56 may present a hexagonal head, or the like, for engagement by a tool whereby demountable to secure the cartridge 45 within the receptacle 46 in the base 34. An annular groove 61 circumscribes the juncture of the flange 56 with the first, tubular portion 55 to receive an O-ring assembly 62. The O-ring assembly 62 is compressed between the flange 56 and the cylinder base 34 to effect a seal around the housing 50 at the opening of the receptacle 46 when the cartridge 45 is properly mounted.

The threads 49 on the tubular portion 55 of the housing 50 extend forwardly from the annular groove 61 only a distance sufficient to assure proper anchoring engagement with the threads 48 on the interior of the receptacle 46. Forwardly of the threads 49 the housing 50 is annularly recessed, as at 64, and forwardly of the recess 64, at the distal end of the housing 50, the first, tubular portion 55 presents a head 65 that engages the interior surface 66 within branch 51A of the feeder passage 51 which communicates with the cylinder port 52. The head 65 is itself annularly grooved, as at 67, to receive an assembly 68 that effects a seal between the head 65 and the interior surface 66 of the branch 51A. A typical assembly 68 may, as shown, employ and O-ring 68A and a backing ring 68B. Because it is quite feasible that the operating pressures may well reach a level such that the O-ring 68A could be subjected to serious "extrusion" deformation between the head 65 and the interior surface 66, a backing ring 68B is provided. For the best results the backing ring 68B should have a plasticity characteristic that will allow it to expand radially under the application of axially applied compressive forces, and thus provide the axially oriented support necessary to preclude the deleterious deformation of the O-ring 68A. This concept is well known to the art, and such backing rings are often fabricated from teflon.

The radially outer, cylindrical, boundary wall 69 of the receptacle 46 and the opposed recess 64 on the first, tubular portion 55 of the housing 50 delineate an annular service chamber 70 therebetween. The branch 51B of the feeder passage 51 opens into the service chamber 70. Thus, the pressurized hydraulic fluid within the feed line 33 has unrestricted access to the full annular surface of the recess 64 in the exterior of the housing 50 for a purpose that will hereinafter become more fully apparent.

The interior of the housing 50 is generally divided into what may conveniently be deemed as a wet side 75 and a dry side 76. The wet side 75 is generally encased within the first, tubular portion 55 of the housing 50, and the dry side 76 is generally encased within the second, and exterior, tubular portion 58 of the housing 50. The two sides 75 and 76 each comprise cylindrical cavities. The diameter of the cavity comprising the wet side 75 is preferably of somewhat lesser diameter than is the diameter of the cavity comprising the dry side 76. In that way the intersection of the two cavities is delineated by a radially disposed shoulder 78. The cylindrical wall 80 bounding the interior of the wet side 75 is preferably polished to provide a smooth surface along which the hereinafter described members received within the wet side 75 may easily slide. On the other hand, the cylindrical surface 81 bounding the dry side 76 is threaded along substantially its full length to permit certain of the hereinafter described members to be fixedly positioned within the dry side 76. The threaded surface 81 terminates in axially spaced relation from the shoulder 78 in order to provide a smooth, cylindrical sealing surface 82 that extends between the threaded surface 81 and the shoulder 78.

The wet and dry sides 75 and 76 are physically separated by a divider plug 83. The base portion 84 of the plug 83 is threaded to engage the threaded interior surface 81 of the dry side 76, and the plug 83 is thereby screwed into the dry portion 76 until the end wall 85 of the plug 83 is firmly seated against the shoulder 78. The radially outer, cylindrical surface 86 on the forward portion 88 of the divider plug 83 is also grooved, as at 89, to receive an O-ring assembly 90. The interposition of the O-ring assembly 90 within the groove 89 coacts with the sealing surface 82 to preclude the passage of hydraulic fluid 26 from the wet side 75 into the dry side 76 along the juncture of the plug 83 with the interior surface 81 of the housing 50.

A spool 95 is slidingly received within the wet side 75 of the housing 50, and that portion of the spool 95 disposed in proximity to the divider plug 83 constitutes a piston end 96 which slidingly engages the cylindrical surface 80 within the housing 50 for reciprocation therealong. A plurality of annular grooves 98 circumscribe the piston 96 and define a labyrinth seal by which not only to minimize the flow of fluid, even under considerable pressure, along the surfaces that comprise the sliding engagement between the piston end 96 of spool 95 and the interior surface 80 but also to balance, or hydro-dynamically to center, the spool 95 with respect to the the cylindrical surface 80 of the housing 50. These annular balancing grooves 98 also permit sufficient access of the hydraulic fluid 26 therealong to achieve the desired lubrication to those same surfaces.

A piston head is formed by a wall 100 that extends transversely of the spool 95 at the piston end 96 thereof. The wall 100 substantially closes the piston end 96, which faces the end wall 85 of the divider plug 83. The wall 100 is, however, penetrated by a central aperture 101 which permits a control rod 102 freely to reciprocate therethrough. The control rod 102 is connected to a control piston 105 that is received within a sensing sub-chamber 106 contained within the spool 95 for at least limited reciprocating movement. The sensing sub-chamber 106 is bounded on one side by the transverse wall 100 and on the other side by a damping washer 108 that is disposed in parallel, spaced relation with respect to wall 100. In fact, as will hereinafter be more fully explained, the axial spacing between the damping washer 108 and the transverse wall 100 is quite small.

In addition to the sensing sub-chamber 106 the interior of the spool 95 also contains a flow chamber 110. The damping washer 108 serves as the divider between the sensing sub-chamber 106 and the flow chamber 110. The flow chamber 110 desirably has virtually unrestricted communication with branch 51A of the feeder passage 51. The sensing sub-chamber 106 and the flow chamber 110 may both conveniently be of cylindrical cross-section, and in order to provide an acceptable means by which to mount the damping washer 108, the sensing sub-chamber 106 may be of lesser diameter than the diameter of the flow chamber 110. This difference in diameter provides a shoulder 111 against which the damping washer 108 may repose. It may also be desirable to undercut an annular notch 112 adjacent the shoulder 111. The notch 112 is adapted to receive the edge of the damping washer 108 and thereby fixedly position the damping washer 108 between the sensing sub-chamber 106 and the flow chamber 110.

The damping washer 108 is provided with an aperture 113, the diameter of which is preferably less than the diameter of the control piston 105 which is received within the sensing sub-chamber 106. The size and location of the aperture 113 are chosen such that engagement of the control piston 105 against the damping washer 108 will at least momentarily block the aperture 113. However, the surfaces on the control piston 105 and the damping washer 108 which come into engagement need not be precisely polished inasmuch as the objective of bringing those two surfaces into engagement is to effect a momentary seal between the sensing subchamber 106 and the flow chamber 110. In fact, a total seal is undesirable to the operation of the flow control valve 10. The purpose of the aforesaid engagement is merely to restrict, or throttle, the flow through the aperture 113. In order to provide the requisite sensitivity for the operation of the control valve 10, the clearance between the control piston 105 and the damping washer 108 must be quite small. For example, in a typical installation the spacing between the control piston 105 and the damping washer 108 need only be on the order of several thousandths of an inch (several thousandths of a centimeter) when the piston 105 is fully seated against the transverse wall 100.

A bleeder passage 114 penetrates the transverse wall 100 in order to connect the sensing sub-chamber 106 to a variably sized equalizing chamber 115 that is formed by whatever space exists between the end wall 85 of the divider plug 83 and the instantaneous location of the transverse wall 100 on the spool 95 as the latter reciprocates to and fro within the wet side 75 of the housing 50. The control rod 102 extends from the control piston 105, through the central aperture 101 in the transverse wall 100, across the equalizing chamber 115, along the axial bore 116 that traverses the length of the divider plug 83 and into engagement with a spring cap 118 that is movably received within the dry portion 76 of the housing 50.

A seal means surrounds the control rod 102 to coact with the divider plug 83. For example, the end wall 85 of the divider plug 83 may be recessed by a stepped counterbore that is disposed concentrically of the axial bore 116. A stuffing material 120 may be packed within the first step 121 of the counterbore to effect the necessary seal, and a retaining ring 122 may be frictionally received within the second step 123 of the counterbore to maintain the stuffing material 120 in place.

It should also be noted that the rearwardly directed end of the aperture 116 through the divider plug 83 is provided with opposed slots 124A and 124B which extend diametrically outwardly of the aperture 116. The slots 124A and 124B are configured to received the blade of a screw driver, or the like, whereby to facilitate threaded insertion, or extraction, of the divider plug 83 relative to the dry portion 76 of the housing 50.

Returning now to a description of the spool 95, a stepped skirt 125 extends concentrically from the piston 96 on that side thereof opposite the transverse wall 100 and is, therefore, movably received within the wet portion 75 of the housing 50. The first step 126A of the skirt 125 provides an annulus that is penetrated by a plurality of radially oriented communicating ports 128. In the exemplary embodiment depicted four such communication ports 128 are spaced circumferentially of the step 126A on skirt 125.

The second step 126B of skirt 125 begins at the shoulder 129 which delineates the juncture with the first step 126A and presents a cylindrical outer surface 130 of further reduced diameter than that of the outer surface 131 on the annulus which constitutes the first step 126A. A flow control sleeve 135 is slidingly received on the outer surface 130 of the second step 126B.

The flow control sleeve 135 has a hollow, annular body portion 136, the cylindrical outer surface 138 of which slidingly engages the interior surface 80 of the wet side 75. An end flange 139 extends radially inwardly from the annular body portion 136 at the axially innermost end of the sleeve 135 slidingly to engage the outer surface 130 of the second step 126B on skirt 125. A detecting head 137 is presented from the end flange 139 and is oriented in opposition to, and is sometimes partially engaged by, the shoulder 129.

When the spool 95 is received within the wet side 75 of the housing 50 it may be operatively retained therein by virtue of a retaining ring arrangement 140 removably secured within a radially outwardly directed groove 141 incised within the circumference of the cylindrical surface 80 at the outermost end of the flow chamber 110.

An end plug 143 has a hollow core portion 144 that is fixedly secured within the interior of the flow chamber 110. The interior of the core portion 144 comprises a passage 145 of the maximum permissible diameter so as not to restrict communication between the flow chamber 110 and branch 51B of the feeder passage 51. The axially outer extremity of the core portion 144 terminates in a radially outwardly directed foot flange 146. The foot flange 146 extends radially outwardly beyond the second step 126B of the skirt 125 to provide a radially directed shelf 148 against which a compression spring 150 can react. The compression spring 150 extends between the shelf 148 and the end flange 139 of the flow control sleeve 135 to bias the flow control sleeve 135 toward engagement with the shoulder 129.

To conclude the description of the wet side 75, the service chamber 70 has, at least during selected periods in the operation of the valve 10, access to a distribution chamber 155 by virtue of a plurality of entrance ports 156 that penetrate the annular recess 64. In the exemplary construction represented in the drawings eight such ports, spaced circumferentially of the recess 64, are depicted.

As will become apparent during that portion of the description directed to the operation of valve 10, the distribution chamber 155 is not stationary, but rather moves with the spool 95. In addition, the axial dimension of the chamber 155 is directly varied by movement of the flow control sleeve 135 along the second step 126B of the skirt portion 125. In fact, the entrance ports 156 can even be totally closed by the flow control sleeve 135 when the spool 95 has moved to its innermost position with the transverse wall 100 bottomed against the end wall 85 of the divider plug 83. Communication between the service chamber 70 and the distribution chamber 155 is, however, continuously maintained—even when the entrance ports 156 are thus sealed by the flow control sleeve 135—by virtue of an accessing port 158. As such, the axial distance between the accessing port 158 and the end wall 85 on the divider plug 83 must be less than the axial dimension between the shoulder 129 at the juncture of the first and second steps 126A and 126B, respectively, of the skirt 125 and the transverse wall 100 on the piston portion 96 of the spool 95. Continuing with the exemplary construction, one may conveniently employ a single such accessing port 158.

Turning now to a description of the dry chamber 76, a reaction pad 160 is selectively located within the dry portion 76. To facilitate adjusting the location of the reaction pad 160 it may be threaded along the surface 81 within the dry portion 76.

A pair of concentrically disposed, coiled compression springs 161 and 162 operate between the spring cap 118 and the reaction pad 160. The springs may be maintained in their concentric disposition by virtue of the configuration selected for the spring cap 118. One convenient way to achieve the desired result is to form that side of the spring cap 118 facing the springs 161 and 162 with a series of concentrically stepped cylinders. The first cylinder 163 is stepped radially inwardly from the outer edge 164 of the spring cap 118, and one end 165 of the spring 161 frictionally engages the first cylinder 163. The second cylinder 166 is stepped radially inwardly from the first cylinder 163, and one end 168 of the spring 162 frictionally engages the second cylinder 166. In this way the two springs are not only carried on the spring cap 118 but are also maintained thereby in their concentric disposition. Even so, it is considered to be good practice to employ springs of opposite hand in order to preclude any possible binding of either spring between the coils of the other spring.

In order to obviate undesirable binding of the spring cap 118 against the interior surface 81 of the dry side 76, that face 169 of the spring cap 118 directed toward the divider plug 83 may be provided with a blind bore 170 to receive the free end 103 of the piston rod 102 and thereby constrain the spring cap 118 to move along the longitudinal axis of the dry end 76 without fouling against the interior surface 81 thereof.

An indicator plug 173 is received within the open end of the dry side 76 of the housing 50 to complete the pressure compensated flow control valve 10.

OPERATION

Preamble

In order to convey an explanation as to the operation of the unique flow control valve 10 with the greatest clarity, its operation should be described in conjunction with a typical working environment. As such, the detailed operation of the flow control valve 10 will be provided in the environment of a fork lift truck 11. In addition, it must be appreciated that flow through the valve 10 in one direction is to be unimpeded. In the operational environment of a fork lift truck 11 the flow is to be unimpeded when the forks 18 are being lifted, irrespective of the magnitude of the load 19 carried thereon. As such, one portion of the explanation will be directed solely to the operation of the valve 10 when the fork lift truck 11 is in the "lifting mode."

Conversely, when the forks 18 are being lowered the flow control valve 10 is desirably not responsive to any changes in loading of less than fifteen percent of the rated load capacity of the fork lift truck 11. However, when a load change of greater than fifteen percent is imposed on the forks 18, the reaction of the flow control valve 10 to that change in loading must be delayed only for a sufficient time to distinguish between a momentary, apparent load change and an actual change in loading and then be rapidly responsive if an actual change in loading is being experienced. As such, another portion of the explanation will be directed solely to the operation of the valve 10 when the truck is in the "lowering mode."

However, before focusing on the detailed operation of the flow control valve 10 during the lifting and lowering modes of the fork lift truck 11, a general description of the biasing forces acting on the spool 95, both hydraulic and mechanical, will be provided. Accordingly, the following narration will begin with a discussion of the hydraulic and mechanical forces which bias the spool 95.

Spool Biasing Forces

By way of an introduction to the detailed operational explanation of the valve 10 that follows, it is appropriate to explain the source, and general application, of two forces that bias the spool 95 in opposition to the pressure within flow chamber 110, and thus in response to the pressure of the hydraulic fluid within the cylinder 20, as sensed by the valve 10. These compensating forces serve to bias the spool 95 toward a position within the wet side 76 of the housing 50 that is most advantageous for the particular pressure encountered in the cylinder 20. With the spool 95 thus advantageously positioned in response to the compensating forces, the flow control sleeve 135 is able to regulate the flow of hydraulic fluid through the valve 10 more quickly and accurately at those times when quickness and accuracy are most important. The affect of these compensating forces must always be considered in order properly to understand the operation of the valve 10.

First, it must be recognized that the resultant force acting on the spool 95 as a result of the pressure differential applied thereto by the pressurized hydraulic fluid 26 within the valve 10 tends to move the spool 95 continuously to the left as viewed in FIG. 4. This desired force imbalance exists even when the pressure of the hydraulic fluid 26 is equalized throughout the valve 10, and it occurs because the work area on the surface of the transverse wall 100 facing the equalizing chamber 115 is less than the opposed work area on the spool 95 by an amount equal to the cross sectional area of the piston rod 102.

Second, it must also be recognized that the springs 161 and 162 tend to resist the movement of the spool 95 induced by the above noted resultant force applied to the spool 95 by the pressurized hydraulic fluid 26. The resistive force applied by springs 161 and 162, though continuously available, act, from time to time, to a greater or lesser degree.

The spring 161 is a relatively low rate spring, and it yieldingly resists movement of the spool 95 toward the divider plug 83 under those operating conditions when the hydraulic pressure in the cylinder 20, as sensed by valve 10, is relatively low. Conversely, spring 162 is a relatively high rate spring, and it yieldingly resists movement of the spool 95 toward the divider plug 83 under those operating conditions when the hydraulic pressure in the cylinder 20, as sensed by the valve 10, is relatively high. The aforesaid springs 161 and 162 are sequentially engageable in that spring 161 may be axially longer than spring 162 and will, therefore, engage the reaction pad 160 in advance of the engagement therewith by spring 162.

With the exception of apparent loading on the cylinder 20 as well as transient loading on the cylinder 20, two conditions that will hereinafter be explained in detail, the pressure of the hydraulic fluid 26 within the cylinder 20 is generally a direct function of the weight of the load 19 carried on the forks 18.

Inasmuch as the interaction of the hydraulic and mechanical forces acting on the spool 95 controls the rate at which hydraulic fluid is capable of flowing through the valve 10, and further because the resultant overall force acting on spool 95 is a function of the hydraulic pressure in cylinder 20 relative to the mechanical resistance applied by the springs 161 and 162 (that mechanical resistance being a function of the individual, and combined, spring rates), one may plot the affect of the springs 161 and 162 upon the rate at which hydraulic fluid flows through the valve 10 under various pressures of the fluid within cylinder 20 when the control sleeve 135 is seated against shoulder 129, as depicted in FIG. 4, in what shall, during the detailed explanation as to the operation of the valve 10, be designated as the "stabilized flow condition."

Figure 6:
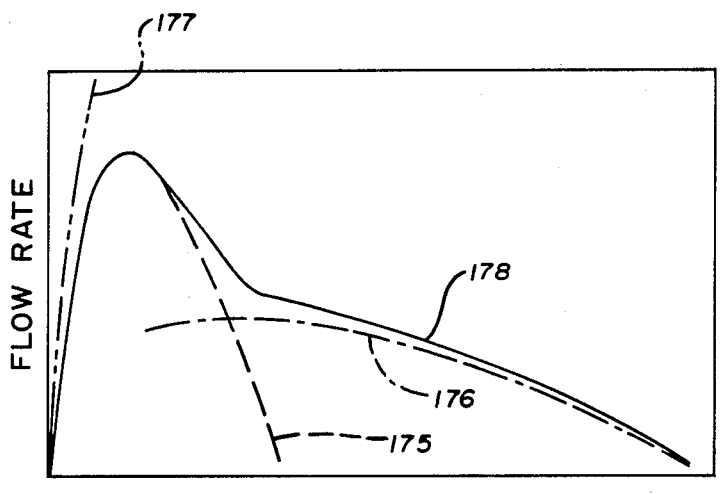

Understand, therefore, that the graph of FIG. 6 reflects the characteristic flow rates under stabilized flow conditions in the lowering mode. When one fully comprehends the operation of flow control valve 10 it will be implicitly understood that the flow control sleeve 135 provides a dual function. First, the sleeve 135 is displaced to the right, relative to the spool 95, and as viewed in FIG. 4, when the handle 38 of system control valve 30 is pivoted rearwardly (to the left as viewed in FIG. 5) allowing pump 28 to force fluid into the actuating conduit 33 and through flow control valve 10 to raise the pressure in cylinder 20 to a level where the resulting force applied to piston rod 24 exceeds the level required to raise the load 19 placed on the forks 18 of the fork lift truck 11. The aforesaid displacement of the sleeve 135 to the right, against the biasing action of spring 150, is caused by a pressure imbalance that begins when fluid 26 flows from conduit 51B, via service chamber 70, through entrance ports 156 and into distribution chamber 155. This pressure imbalance effects a leftward movement of spool 95, again as viewed in FIG. 4 and as will hereinafter be more fully described, but for the present suffice it to say that the leftward movement of the spool 95 allows the sleeve 135, mounted on the skirt 125 of the spool 95, to at least partially block the entrance ports 156. It is this blockage of the entrance ports 156 which creates the pressure differential across the ports 156 that results in the application of a force differential to the sleeve 135. Specifically, the force applied against the detecting head 137 of the sleeve 135 that is exposed to the pressure in distribution chamber 155 is greater than the force applied to the opposed surfaces of the sleeve 135 as a result of the pressure within the flow chamber 110. This combination flow/pressure force will move the sleeve 135 rightward against the very light resistive pressure of spring 150, thus providing an unrestricted flow path through entrance ports 158. An unrestricted flow path through the entrance ports 156 thus assures an unrestricted flow path from the feeder passage 51B to the flow chamber 110, and thus into the cylinder 20. Although only briefly explained at this point in the operational description, one should now have some insight as to how the unrestricted, or free flow, characteristic for the flow control valve 10 is accomplished.

When one fully comprehends the operation of valve 10 it will be implicitly understood that the flow control sleeve 135, operating in conjunction with the spool 95 as it is being axially translated leftward within the wet side 75 of the housing 50, modifies the orifice size (as will be important in controlling the fluid flow rates during the lowering mode) of the entrance ports 156 to provide a reduction in the flow rate in response to increasing pressure in cylinder 20 during the lowering mode of the fork lift truck 11, as represented by the curves depicted in FIG. 6.

A critical feature to the operation of the flow control valve 10 is that the fluid flow rate for the lowering mode is "set" by the position of spool 95, and its attendant flow control sleeve 135, relative to the entrance ports 156 such that a safe lowering speed is obtained relative to the magnitude of the load 19 placed upon the forks 18 of the fork lift truck 11 prior to the initiation of a lowering signal at the system control valve 30.

Referring, then, specifically to FIG. 6 the spring 161 is preferably selected to provide a curve in the nature of that designated by the numeral 175. The curve 175 displays a steady rise in the flow rate of hydraulic fluid 26 through the valve 10 up to a predetermined pressure in the cylinder 20 that is controlled by the natural, composite flow restriction which exists simply by virtue of the natural resistance to fluid flow through the control valve 10 (even when it is set for unrestricted flow, as represented by curve 177), the size, length and path of the actuating conduit 33 and the low pressure exhaust conduit 35 as well as the nature of the system control valve 30. Thereafter, a continued increase of the pressure in the cylinder 20 effects a reduced flow rate of the hydraulic fluid 26 through the valve 10 caused by the control interposed by operation of the valve 10.

Continuing with reference to FIG. 6, the spring 162 is selected preferably to provide a curve in the nature of that designated by the numeral 176. The curve 176 displays a much slower change in the flow rate of hydraulic fluid 26 through the valve 10 up through the entire range of pressures that can occur in the cylinder.

The nature of the rate of spring 162 provides a negative, or reduced, flow rate curve with increases in cylinder pressure. Curve 178 provides a composite picture of the operational control of valve 10 that will result in reducing the lowering flow rate, out of the lift cylinder 20, throughout the entire range of loads 19 that could be positioned on the lift truck 12 forks 18. It is created by the interaction of springs 161 and 162 in relation with the control rod 102 and the spool 95 and the sleeve 135 carried on spool 95.

Lifting Mode

To begin the explanation as to the operation of the unique pressure compensated flow control valve 10 embodying the concepts of the present invention it will be assumed that the forks 18 are in their lowermost position and that they are to be raised with, or without, a load. This operation is initiated when the operator pivots the handle 38 (FIG. 5) rearwardly to translate the spool 36, against the biasing action of the centering spring 39, within the system control valve 30 such that the duct 40 permits hydraulic fluid 26 to flow, under the pressure supplied by pump 28, from the supply conduit 32, through the valve 30 and outwardly thereof through actuating conduit 33. The aforesaid disposition of the spool 36 within the valve 30 will hereinafter be designated as the "lift position" of the system control valve 30.

When the system valve 30 is in the lift position, the hydraulic fluid 26 flows into the service chamber 70 of the valve 10, through the entrance ports 156 (if they are open to any degree) and into the distribution chamber 155, through entrance ports 156, and the accessing port 158, into flow control chamber 110 and through the inlet port 52 into cylinder 20 where it is opposed by the "resistive force" imposed by the weight of any load 19 on the forks 18 as well as the weight of: the forks 18 themselves, the hoist carriage 17, the drive cables 21, the sheaves 22, the beam 23 and the piston rod 24. Pressure builds up in the entire control system until it imparts a force sufficient to exceed the aforesaid resistive force, at which point the piston rod 24 extends at whatever flow rate is determined by the pump 28.

Under this condition the pressure increase in flow chamber 110, and hence in sensing sub-chamber 106, causes a pressure imbalance to exist which results in leftward movement of spool 95 and control rod 102, as presented in FIG. 4, against springs 161 and 162 as described earlier. This leftward movement of the spool 95 positions the shoulder 129 such that the sleeve 135 carried on the spool 95 is physically capable of blocking, and thereby effecting a restriction to, the flow of fluid through the entrance ports 156. The direction of fluid flow in the lifting mode—i.e., from the service chamber 70 inwardly through entrance ports 156 (which may be partially blocked by the sleeve 135) creates a pressure restriction at the interface between the inner surface of the entrance ports 156 and the detecting head 137 on sleeve 135. This pressure imbalance across the entrance ports 156 creates a force imbalance to the right which is actively resisted by spring 150, but when the force imbalance is sufficient, spring 150 compresses, permitting sleeve 135 to move to the right, thus eliminating the blocking restriction to the flow of fluid through the entrance ports 156. Sleeve 135 will be maintained in this rightward, force biased position for as long as flow continues through the valve 10 in the lifting mode, thus continuing to extend the cylinder rod 24 and lift the forks 18.

The pressure differential herein described acts upon the spool 95 to bias it to the left as viewed in FIG. 4. The spool 95 is capable of moving in that direction until either the transverse wall 100 on the spool 95 bottoms against the end wall 85 of the divider plug 83, or until the biasing action of the spring 161, acting either alone or in cooperation with the spring 162, is sufficient to overcome the resultant force applied by the fluid pressure acting to so move the spool 95. As set forth in the preamble to this operational explanation, the leftward movement of the spool 95 effected by the hydraulic force imbalance continues even after the pressure in the equalizing chamber 115 equals that in the flow chamber 110 because of the different work areas against which the pressure is applied.

Once the operator pivots the handle 38 back to its central, or neutral, position the valve 30 is returned to its central position, thus forcing the pump 28 to circulate the fluid 26 through conduit 32, the valve 30 and back through exhaust conduit 35 into the reservoir 25. The fluid retained in conduits 33, 51A and 51B as well as all wet areas of valve 10 are held in a static condition. The cessation of fluid flow through the entrance ports 156 in the direction associated with the lifting mode eliminates the pressure imbalance interposed on sleeve 135, and the biasing spring 150 is, therefore, able to urge sleeve 135 leftward until it comes to rest against shoulder 129. The control valve 10 is now properly "set" with the spool 95, and the sleeve 135 carried thereon, properly positioned to provide a lowering speed compatible with the load 19 carried on the forks 18 during the lifting mode.

As shown on FIG. 6 it is assumed that in raising the forks 18 with no load carried thereon the cylinder 20 in the exemplary truck 11 will reflect approximately a 300 pound per square inch (2.07 MPa) pressure on the hydraulic fluid 26 therein. To accommodate that assumption the spring 161 is selected such that it will allow the spool 95 to move toward the divider plug 83 no further than permitted in order to maintain the entrance ports 156 full open in response to the expected pressure in the cylinder 20 under a no load condition. As such, the valve 10 will allow the maximum rate of flow therethrough in a no load condition. It should now also be understood that the same operation occurs even when the maximum load 19 is being lifted on the forks 18. In either extreme, or any load therebetween, the maximum fluid flow is permitted through the valve 10 in the lift mode.

In the foregoing discussion it has been assumed that the the operator pivoted the control lever 38 to interrupt, or stop, the lifting mode. For a complete understanding one should also contemplate what happens if the operator does not manipulate the system control valve 30 to halt the lifting mode. Specifically, the hoist carriage 17 will continue to elevate until either the operator allows the system valve 30 to return to the neutral position depicted in FIG. 5 or until the hoist carriage 17 and the supplemental mast 16 reach their fully upwardly extended position. In the latter situation a stop means, not shown, is built into the cylinder 20. The stop means limits further extension of the mast 16, but the valve 10 senses an increased load. There is, in fact, an increase in the hydraulic load on the system, but this self applied load is comprised of the structural stress imparted to the cylinder itself by the fluid pressure within cylinder 20, and not by any actual load 19 received on the forks 18.

The initial response of the valve 10 to the aforesaid self applied load is to increase the pressure in flow chamber 110 causing an instantaneous application of maximum pressure to piston 105. This maximum pressure on piston 105 acts instantaneously to move the control rod 102 rapidly to the left, compressing springs 161 and 162 and at the same time urging the spool 95 to the left. The maximum pressure that can be applied to the control system is limited by the relief valve 37 communicating with conduit 32. The relief valve 37 is normally selected to open in response to a pressure that is in excess of the pressure that would be imposed by a maximum rated load 19 on the forks 18. Irrespective of whether the pressure relief valve 37 opens or the operator pivots the lever 38 to the neutral position, the geometry of the valve 10 is such that the entrance ports 156 will be fully closed by the disposition of the sleeve 135 when the valve 10 is subjected to an actual, or self applied, load in excess of the rated load 19. Hence, in this situation, as well, the valve is "set" to the load 19 applied to the system before the lowering mode is initiated.

Lowering Mode

In order to lower the forks 18 the operator pivots the handle 38 forwardly, as depicted in FIG. 5, to translate the spool 36, against the biasing action of the centering spring 39, within the system control valve 30 such that the duct 41 permits hydraulic fluid 26 to flow from the now return line 33, through the valve 30 and outwardly thereof through exhaust conduit 35. The aforesaid disposition of the spool 36 within the valve 30 will hereinafter be designated as the "lowering position" of the system control valve 30.

When the system valve 30 is disposed to lower the forks 18, irrespective of the actual loading condition on the forks 18, the valve 10 will already have responded to the fluid pressure sensed in the cylinder 20, and that condition has heretofore been described in conjunction with the maximum loading on the system, albeit only a self applied, apparent loading. With the system valve 30 in the lowering position, and with the sleeve 135, therefore, blocking the entrance ports 156, the fluid 26 within flow chamber 110 is relieved through the accessing port 158. With no load on the forks 18 the pressure in the flow chamber 110 lowers rather quickly, and the combined action of the springs 161 and 162 moves the spool 95 slowly to the right, as viewed in FIG. 4, to open the entrance ports 156, which permits the fluid in chamber 110, as well as that entering chamber 110 from the cylinder 20, to exhaust outwardly through the ports 156, the service chamber 70, the return line 33, the system valve 30 as well as the conduit 35 and then into the reservoir 25, virtually without restriction. Thus, under a no load condition the forks 18 are lowered at a rate determined by how quickly the fluid 26 can return to the reservoir 26 from cylinder 20 through an essentially fully open valve 10, even though the valve 10 was initially set, or predisposed, to exhaust the fluid quite slowly, as it should under a maximum load condition.

Let us now examine what occurs if a heavy, actual load is supported by, or applied to, the forks 18 when the masts have been extended. The load 19 on the forks 18 is reflected by the hydraulic pressure in the cylinder 20 that is required to support that load. The valve 10 senses the actual load 19 and reacts in the same manner as was previously explained with respect to the self applied, apparent loading condition. That is, the spool 95 is moved to the left within the wet side 75 of the housing 50 until either the transverse wall 100 on spool 95 bottoms against the divider plug 83 or the springs 161 and 162 combine to balance the differential hydraulic pressure applied against the piston 105. The extent to which the entrance ports 156 are thus blocked by the flow control sleeve 135 depends upon the location at which the hydraulic pressure acting on the piston 105 is balanced by the biasing action of the springs 161 and 162. This, in turn, controls the leftward positioning of the spool 95. Under the maximum load the entrance ports 156 may be completely blocked, and under a partial load they would only be partially closed. As such, the valve 10 dynamically prepares properly to accommodate the loading conditions even when the system is static. This feature assures that the valve 10 will "set" for the lowering mode by the application of a load 19 to the forks 18 at any elevation of the forks 18. Moreover, the appropriate "set" will result if the load 19 is applied incrementally, as would occur when a workman manually loads the forks 18, or if the load 19 is applied virtually instantaneously, as would occur, for example, when the load 19 is transferred from one fork lift truck to another.

Thus, when the operator moves the system valve 30 to the "lowering position" the valve 10 has already been "pre-programmed" to restrict the rate at which the load 19 is lowered in response to the weight of the load 19, as that load is reflected by the hydraulic pressure in the cylinder 20.

Specifically, as the operator moves the valve 30 to the lowering position there is a pressure reduction in the entrance ports 156 which would effect a pressure differential at detecting head 137 on sleeve 135 seated against the shoulder 129. The biasing pressure applied against the spool 95 by the action of the springs 161 and 162 against the control rod 102 is balanced by the pressure in cavities 110 and 75, which reflects the pressure in the cylinder 20 resulting from the heavy load 19 on forks 18. Hence, the exiting flow of fluid 26 through the valve 10 will be greatly limited, and the load will be lowered at a suitably slow rate.

Should the operator inadvertently drive the truck 11 across the surface 14 before the load 19 has been suitably lowered, the valve 10 will respond to apparent load reductions and increases by moving the spool 95, and the sleeve 135, within a range which maintains the entrance ports 156 acceptably restricted, thereby obviating the potential problems that could result by lowering a heavy load too quickly. To expand upon this situation, the wheels 13 could strike an irregularity in the surface 14 over which the truck 11 is being moved. Irregularities are generally either sudden drops or sudden rises in the otherwise relatively smooth surface 14.

A sudden drop in the surface 14 over which the truck 11 is operating tends instantaneously to effect an apparent reduction in the actual loading on the system, and that situation is reflected by a sudden decrease of the pressure in cylinder 20, as sensed by the flow control valve 10. A sudden rise in the surface 14 over which the truck 11 is operating tends instantaneously to effect an apparent increase in the actual loading on the system, and that situation is reflected by a sudden increase of the pressure in cylinder 20, as sensed by the valve 10. In either event, the valve 10 reacts sufficiently slowly to allow a distinction to be made between a transient, apparent change in the load 19 and an actual change in the load 19, and yet the time lapse required is not so slow that any appreciable increase in the lowering speed of the forks 18 will be permitted. The necessary, though brief, delay required to distinguish between an apparent and an actual change in the load 19 is provided by the reaction of the spool 95, and the sleeve 135, to the change in pressures within the cylinder 20, as sensed by the valve 10.

Specifically, spool 95, and its attendant sleeve 135, resists any movement to the left or right when a fork lift truck is moving forwardly over a surface 14 and encounters a bump. As noted, a bump will either momentarily increase or momentarily decrease the pressure in cylinder 20, and that pressure change is immediately transmitted to chamber 110.

First, let's more closely examine what occurs when an increase of the pressure in cylinder 20 is sensed. If a pressure increase is sensed in chamber 110, that pressure would apply an increased force on the piston 105 which would urge the control rod 102 to move to the left as viewed in FIG. 4, further compressing the springs 161 and/or 162. Even though the spool 95 might begin to move to the left, the fluid flow pressure across the entrance ports 156 would cause the sleeve 135 to remain in a momentarily fixed position relative to the entrance ports 156, thus momentarily locking it in a fixed orifice condition. If the pressure is transient, the control rod 102 will return to the position to which it was "set" prior to the application of the transient load change, thus permitting spool 95 to return to its concomitant "set" position.

If, on the other hand, the change in pressure is created by an actual increase in the load 19, the sleeve 135 will slowly "follow" spool 95 until it again rests against shoulder 129, thereby effecting an increased blockage of the entrance ports 156.

Now let's more closely examine what occurs when a decrease of the pressure in cylinder 20 is sensed in chamber 110 of the valve 10. If the pressure is suddenly lowered, control rod 102 will respond instantaneously because it has been positively biased with a load force from springs 161 and 162. This will cause the control rod 102 to shift to the right, causing the piston head 105 to block aperture 113, thereby deterring the flow of oil from chamber 110 into chambers 106 and 115. This effectively blocks movement of the spool 95, forcing it to stay in position and preventing it from shifting to the right, at least during the time interval required to distinguish between a transient reduction of the loading and an actual reduction of the loading on the forks 18.

SUMMATION

It should, therefore, now be apparent that in raising any load 19 the valve 10 will not restrict the flow of fluid therethrough in order that fluid flow into the cylinder 20 will be at the maximum rate and maximum pressure that can be supplied by the pump 28. However, if the load 19, even a heavy load, is removed after it has been lifted, the valve 10 will, unlike the majority of those disclosed by the prior art, immediately compensate and allow the forks 18 to be lowered at the highest speed appropriate to the size of the load 19 remaining on the forks 18. This same control over the lowering speed of the forks 18 will be effected by the valve 10 when the load 19 is increased prior to the lowering of the forks 18.

Accordingly, a pressure compensated flow control valve embodying the concepts of the present invention allows unrestricted fluid flow therethrough during the lifting mode and yet is fully, and continuously, responsive to actual, apparent, and/or transient pressures applied thereto by the cylinder 20 during the lowering mode in order to regulate the flow of fluid therethrough in an efficient and safe manner, while otherwise accomplishing the objects of the invention.

I claim:

1. A pressure compensated flow control valve comprising:
   a housing;
   at least one cavity within said housing;
   said housing cavity being bounded by a smooth interior surface;
   a spool;
   said spool having a piston portion and a skirt portion extending outwardly of said piston portion;
   said piston portion of said spool slidingly engaging the smooth interior surface of said housing cavity for reciprocation within said cavity;
   a distribution chamber located radially inwardly of the smooth interior surface within said housing and radially outwardly of said skirt portion;
   entrance port means to provide communication between said distribution chamber and the exterior of said housing;
   a flow chamber disposed interiorly of said skirt means;
   passage means to provide continuous communication between said flow chamber and the exterior of said housing;
   communicating port means penetrating said skirt portion to provide communication between said distribution chamber and said flow chamber;
   a flow control sleeve slidingly mounted on said skirt portion and slidingly engaging the interior of said housing cavity progressively to open and close said communicating port means; and,
   means to resist axial translation of said spool in said housing cavity, said means acting in opposition to hydraulic pressure in said flow chamber.

2. A pressure compensated flow control valve, as set forth in claim 1, wherein said means to resist axial translation of said spool comprises:
   hydraulic biasing means; and,
   mechanical biasing means, said mechanical biasing means acting in concert with said hydraulic biasing means.

3. A pressure compensated flow control valve, as set forth in claim 2, further comprising:
   an accessing port also penetrating said skirt portion to provide continuous, though restricted, communication between said distribution chamber and said flow chamber without modification by said flow control sleeve.

4. A pressure compensated flow control valve, as set forth in claim 3, wherein said mechanical biasing means comprises:
   a pair of sequentially engageable compression springs to be operably engaged by said spool;
   the first of said pair of springs to be so operatively engaged having a relatively lower spring rate than the second of said pair of springs.

5. A pressure compensated flow control valve, as set forth in claim 3, wherein said hydraulic biasing means comprises:
   a divider means extending transversely of said housing to define an end wall for said housing cavity in which said spool is slidingly received;
   an equalizing chamber interposed between said piston portion of the spool and said end wall; and,
   bleeder passage means communicating from said equalizing chamber to said flow chamber.

6. A pressure compensated flow control valve, as set forth in claim 2, wherein said hydraulic biasing means comprises:
   a sensing sub-chamber interiorly of said spool piston portion;
   a damping washer interposed between said sensing sub-chamber and said flow chamber;
   an aperture penetrating said damping washer to permit communication between said sensing sub-chamber and said flow chamber;
   a divider means extending transversely of said housing cavity;
   an equalizing chamber interposed between said piston portion of the spool and said divider means; and,
   a bleeder passage communicating between said equalizing chamber and said sensing sub-chamber.

7. A pressure compensated flow control valve, as set forth in claim 6, further comprising:
   a control piston received for reciprocating movement within said sensing sub-chamber;
   a control rod secured to said control piston and extending axially through said spool piston portion, said equalizing chamber and said divider means operatively to engage said mechanical biasing means.

8. A pressure compensated flow control valve, as set forth in claim 7, wherein said mechanical biasing means comprises:
   a pair of sequentially engageable compression springs;
   the first of said pair of springs to be so operably engaged having a relatively lower spring rate than the second of said pair of springs.

9. A pressure compensated flow control valve, as set forth in claim 8, wherein said divider means further comprises:
   a plug having an end wall;
   said plug dividing said housing into two internal cavities, one said internal housing cavity being a wet side of the flow control valve and the second said cavity being a dry side of the flow control valve;
   said end wall on said plug disposed in opposition to said piston portion of said spool;
   said hydraulic biasing means being located within said wet side; and,
   said mechanical biasing means being located within said dry side.

10. A pressure compensated flow control valve, as set forth in claim 9, further comprising:
    a spring cap movable within said dry side of said housing;
    said spring cap being operatively engaged by said control shaft;
    a reaction pad secured within said dry side in spaced opposition to said spring cap; and,
    said pair of springs being interposed between said spring cap and said reaction pad.

11. A pressure compensated flow control valve, as set forth in claim 10, wherein:
    said reaction pad has an opening therethrough.

12. A pressure compensated flow control valve, as set forth in claim 11, wherein:
said dry side opens to atmosphere;
an indicator plug is mounted in said housing to lie between said dry side and atmosphere; and,
said indicator plug is displaceable from said dry side toward atmosphere in response to hydraulic pressure in said dry side.

13. A pressure compensated flow control valve, as set forth in claim 12, wherein said spring cap further comprises:
an outer edge;
a face extending transversely of said spring cap and terminating at said outer edge;
a first cylinder on said spring cap being spaced radially inwardly of said outer edge and being located on the opposite side of said spring cap relative to said face;
a second cylinder on said spring cap being spaced radially inwardly of said first cylinder and also being located on the opposite side of said spring cap relative to said face;
said first and second springs being mounted on said spring cap by frictional engagement with said first and second cylinders, respectively;
said first spring being axially longer than said second spring whereby to engage said reaction pad sequentially in advance of the engagement of said second spring with said reaction pad.

14. A pressure compensated flow control valve, as set forth in claim 9, wherein:
said plug has a cylindrical base portion;
threads being provided on said cylindrical base portion;
the interior of said dry side being bounded by a threaded cylindrical surface that extends substantially the full axial extent of said dry side;
said plug being threadably received within said dry side;
means operating in conjunction with said plug to seal said wet side from said dry side;
said reaction pad threadably secured within said dry side.

15. A pressure compensated flow control valve, as set forth in claim 14, wherein:
an axially oriented bore penetrates said body portion of said plug;
said control rod being slidingly received through said bore;
opposed slots extend diametrically outwardly of a portion of said axially oriented bore through said body portion for engagement by the blade of a tool to facilitate threadably mounting said plug within said dry side.

16. A pressure compensated flow control valve, as set forth in claim 15, wherein:
the diameter of said cylindrical dry side is greater than the diameter of said cylindrical wet side to form a shoulder at the demarcation therebetween;
a sealing surface is provided on the cylindrical surface bounding said dry side, said sealing surface being located in contiguous juxtaposition with said shoulder and being disposed between said shoulder and the threads on the cylindrical interior of said dry side;
at least a portion of said seal means being operatively interposed between said plug body portion and said sealing surface; and,
at least another portion of said seal means operatively interengaging said control rod and the said body portion of said plug.

17. A pressure compensated flow control valve, as set forth in claim 7, wherein:
said control piston is substantially circular and has an outer diameter;
said central aperture through said damping washer is substantially circular and has an internal diameter;
said outer diameter of said control piston is greater than said internal diameter of said central aperture through said damping washer.

18. A pressure compensated flow control valve, as set forth in claim 17, wherein said divider means further comprises:
a plug having an end wall;
said plug dividing said housing into two internal cavities, one said internal housing cavity being a wet side of the flow control valve and the second said cavity being a dry side of the flow control valve;
said end wall on said plug disposed in opposition to said piston portion of said spool;
said hydraulic biasing means being located within said wet side; and,
said mechanical biasing means being located within said dry side.

19. A pressure compensated flow control valve, as set forth in claim 18, wherein:
said skirt portion has first and second steps;
said first step being located adjacent to said piston portion and being of lesser diameter than said piston portion;
said second step being adjacent to said first step and being of lesser diameter than said first step;
a shoulder located at the juncture of said first and second steps;
said distribution chamber being disposed along at least the axial extent of said first step and lying radially outwardly thereof; and,
said flow control sleeve being slidingly mounted on said second step.

20. A pressure compensated flow control valve, as set forth in claim 19, wherein:
an end plug is received within the flow chamber and is carried by said skirt portion of said spool;
said passage means which provides continuous communication between said flow chamber and the exterior of said housing extends axially outwardly through said end plug;
an end flange is presented from said end plug and extends radially outwardly thereof beyond the radial extent of at least said second step on said skirt to present a radially disposed shelf;
said flow control sleeve has a body portion that slidingly engages the smooth interior surface that bounds said cavity in said housing forming said wet side;
said body portion of said flow control sleeve being disposed in radially spaced relation outwardly of said skirt portion;
an end flange extends radially inwardly from said body portion of said flow control sleeve slidingly to engage said second step of said skirt portion such that engagement with said shoulder determines the extent to which said sleeve can slide along said skirt portion toward said piston portion; and,
a compression spring means is disposed between said sleeve body portion and said second step of said skirt portion to apply a biasing pressure between said flange on said end plug and said opposed flange on said flow control sleeve.

21. A pressure compensated flow control valve, as set forth in claim 20, wherein:
said housing has a substantially cylindrical outer profile.

22. A pressure compensated flow control valve, as set forth in claim 21, wherein:
a flange extends radially outwardly of said housing along the medial portion thereof;
a threaded portion extends axially of said housing on one side of said flange;
a head portion is provided at the distal end of said housing on the same side of said flange as said threaded portion;
a recess is provided in the exterior of said housing between said threaded portion and said head;
said entrance port means penetrating said housing axially along said recess.

23. A pressure compensated flow control valve, as set forth in claim 22, wherein:
an accessing port also penetrates said recess;
said accessing port being located between said entrance port means and said flange.

24. A pressure compensated flow control valve, as set forth in claim 23, wherein:
the axial distance between said accessing port and said end wall on said divider plug is less than the axial dimension between said shoulder at the juncture of said first and second steps of said skirt and the end of said piston portion facing said end wall on said divider plug.

* * * * *